PUNCHED TAPE READER

Filed Oct. 17, 1963 2 Sheets-Sheet 1

Inventor
JOHN PAUL JONES, JR.
By Watson, Cole, Grindle & Watson
Attorneys

Inventor
JOHN PAUL JONES, JR.

By Watson, Cole, Grindle & Watson
Attorneys

United States Patent Office
3,414,716
Patented Dec. 3, 1968

3,414,716
PUNCHED TAPE READER
John Paul Jones, Jr., Norristown, Pa., assignor to Navigation Computer Corporation, Norristown, Pa., a corporation
Filed Oct. 17, 1963, Ser. No. 316,840
7 Claims. (Cl. 235—61.11)

ABSTRACT OF THE DISCLOSURE

A punch tape reader for purposes of reducing standby power and to provide a compact assembly requiring little maintenance uses solenoid operation of a ratcheting mechanism to advance the tape step by step when receiving an electrical pulse. In order to sense chadless tape movable sensing pins combined with a switch readout assembly are also positioned by solenoid action to pass through holes in the tape and provide static electrical readout signals. To increase operating speed, reduce noise and provide better ratcheting action a resilient bumper is positioned to reverse the solenoid direction near the end of its stroke using the energy stored in the bumper.

This invention relates to punched tape processors, and more particularly it relates to asynchronous step-by-step tape readers.

Operating requirements of a desirable tape reader are many. For reading reliability partially punched holes must be read as well as chadless tape, and dirt or paper particles must not interfere with output signals. Also, the tape should not be torn or worn by the reader to enable the reader to repetitively read a tape segment many times.

In order to be useful with a variety of different digital processing system requirements, a tape reader is preferably synchronizable. That is, a clock pulse from an external source should be able to time the reading action so that the reader itself operates asynchronously. Also information read from the tape should be held without destruction until replaced by the next group of information read so that it is available when called for by the external equipment.

The reader itself undergoes a series of closely timed cyclic operations. For example, it may eliminate previously stored information, advance the tape to a further reading position, sense the information at that reading tape, store the information for use when called for and await a further operation cycle, etc. Thus, complexity of equipment necessary to sequence and time different operational cycles has prevailed in the prior art.

The size, power used and cost should also be minimized, while the reading speed and life of the apparatus is maximized.

To incorporate all of these desirable features in a tape reader of the prior art has seemed impossible since many of the features appeared to be mutually inconsistent. Prior art design techniques have compromised performance and thus have failed to provide a satisfactory reader. Many readers require continuous power and wear. Others are cyclical in operation so that the data processing system must conform to the reader timing. Most are so bulky and expensive that they are not adaptable to use in restricted locations. Others sacrifice reading speed to attain the various complex functions of operation. Perhaps the most significant shortcoming is the maintenance problem afforded by both mechanical and electronic type readers of the prior art. Either they are inaccessible or complex with many parts which can fail. If they are continuously operated, there is wear and aging resulting in frequent failures. Some even require external power sources such as drive shafts and most are not completely self-contained.

Accordingly, it is an object of the invention to provide an improved tape reader.

Another object of the invention is to overcome the above prior art problems in a tape reader.

A further object is to provide a reliably operating tape reader requiring little maintenance.

A more specific object of the invention is to provide a completely self-contained compact tape reader.

Another specific object of the invention is to provide a tape reader which will operate asynchronously at high enough speeds to find significant use in high speed data processing systems.

Thus, in accordance with the invention an electromagnetically operated step-by-step tape reader is provided for advancing punched paper tape from character to character asynchronously in response to a single input reading command. This self-contained reader provides static output signals in terms of type C relay contacts which sense the tape during substantially the entire interval between tape advancing operations. It incorporates new operational principles such that speeds of fifty tape steps per second are readily attainable with electromagnetic circuits formerly operating significantly more slowly. A very compact unit is provided with only a few movable parts, and incorporating novel features leading to a simplified and reliable timing sequence of suboperational steps.

The structural features of the invention together with its mode of operation and further features are described with reference to the accompanying drawing, wherein.

Figures 1, 2:
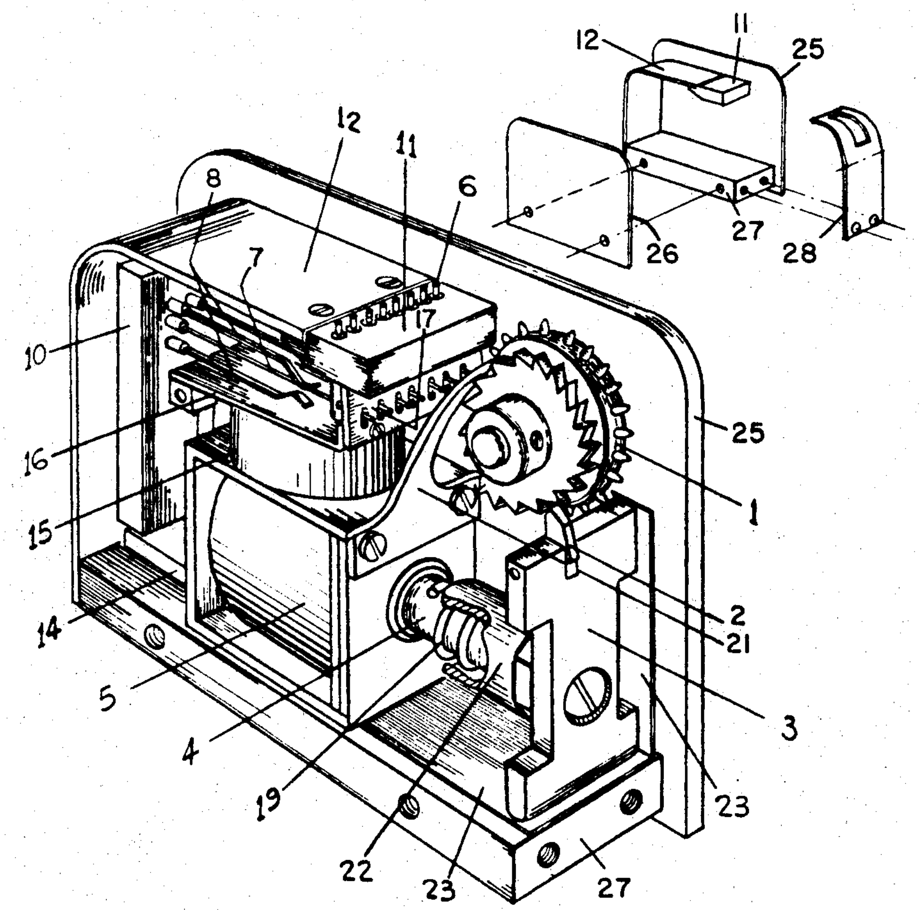
FIGURE 1 is an enlarged perspective view of a punched tape reader embodiment of the invention.
FIGURE 2 is an exploded view of the reader case assembly.

Tape is engaged and advanced in step-by-step fashion along a predetermined path by sprockets on cylinder 1, which has integrally affixed ratchet teeth for mating with the pawl 2. The pawl has a relatively heavy hammer assembly 3 which is reciprocated by action of solenoid core 4 movable within the winding 5 to form a closed magnetic circuit of low reluctance therein.

Reading is accomplished without parts wear by means of pins 6 formed of a plastic such as "Delrin" floated upon or integrally mounted for movement with the spring wire contact arms 7, which engage C type contacts 8 having the V-shaped contact channel with a wiping motion to assure good contact and long troublefree operation. The plastic insulating contact mounting block 10 holds a set of contact arms for external wiring. Thus, in the reader shown eight sensing pins 6 are provided with corresponding switch sets over a one inch platen 12 to handle standard one inch eight hole punched paper tape. This gives a concept of the overall size of the reader which is fully contained in the assembly shown.

Pins 6 are guided loosely through block 11 to sense the tape as held down by the spring loaded tape retainer clip 13, shown dotted in the upward position as held manually when loading the reader with tape. Thus, the sensing pins 6, gently forced by relay contact spring 7, individually either poke through a punched hole or remain in retracted position as held down by the tape to place the coupled spring arm 7 of the relay contacts in the appropriate output signal connection with one of the complementary contacts 8, which preferably are the C type contacts shown. All the dirt and paper particles dragged along by the tape are isolated from the switching contacts in this manner.

Solenoid coil 5 is supported by bracket 14 which also serves as a magnetic path for the pin retracting solenoid 15 and its pin retracting armature 16, upon which is mounted the contact, the plastic insulating caging block 17 loosely engaging each of the spring contact arms 7 to provide contact motion upon solenoid armature movement exceeding the limited free motion inside the caging slots. Retracting arm spring 18 holds the pins normally in an upward position when the solenoid 15 is de-energized, so that holes in a tape position are sensed and static signals are held for use when the tape is idle between step-by-step advances. Similarly a retracting spring 19 serves to push the pawl hammer block 3 away from the solenoid 5 when it becomes de-energized. Pawl stop 20 restricts motion of hammer block 3, when the sprocket wheel 1 is properly ratcheted into an irreversible position held by detent leaf spring 21. As will be explained in more detail later, a rubber pawl hamper block 22 also serves in combination as a forward buffer noise absorbing stop and an aid to retracting spring 19. The rear rubber bumper block 24 serves to receive the return impact of the pawl hammer block 3 and reduce the noise. Cover plate 28 permits the tape to pass smoothly over the sprocket wheel 1 and serves as a mounting base for the bumper block 24.

Movable surfaces of the hammer block 3 rub against the plastic bearing surfaces 23 on three sides to guide the assembly as solenoid core 4 is drawn into the solenoid coil 5. This permits the simple mechanical arrangement shown, and prevents parts from twisting or binding in operation.

In the tape advancing operation, the tape stop position must afford a fixed standard distance between the sensing pins 6 and the sprocket pin position on cylinder 1. For initially gaging this distance, the detent spring 21 is adjusted relative to its mounting screws. After this the tape holes will always register properly with the sensing pins 6.

If it is recognized that the inherent solenoid action is quite slow when enough power is required to advance the tape, then some of the significant operational features of this invention will be appreciated. Inertia comes into play disadvantageously to cause the solenoid 5 to be very inefficient at the beginning of the stroke because core 4 has a high magnetic reluctance air path to overcome. This results in a slow start, low power and wasted energy at the start of the ratcheting period. Additionally, the power is greatest at armature closure without the high reluctance path, but the tape is advanced and the energy is expended in noise uselessly. Also the retentivity of the magnetic paths tends to hold the armature 4 in place long after the solenoid coil 5 is de-energized. Thus, in order to attain practical reading speeds with this simplified and compact electromagnetic tape reader, the ratcheting operation is modified in accordance with this invention.

Initially to overcome the slow start and low power at the start of the tape advance or ratcheting cycle, the hammer block 3 is normally retracted so that pawl 2 does not engage the sprocket tooth on cylinder 1. Thus, the initial load which is moved by the solenoid core 4 is only the hammer assembly 3, which may gain considerable momentum before the pawl 2 engages the greater load of the sprocket wheel which moves the punched tape. In this manner, significantly greater power and speed is attained from the solenoid 5 at the outset.

Rubber bumper 22 also plays a significant part in modifying solenoid action. It is dimensional to engage the hammer block 3 immediately after the pawl 2 advances the ratchet to the next tape stop, and when the core 4 is substantially fully inserted in solenoid 5. Not only does this eliminate the noise otherwise present when the core is seated with the full driving force at the end of the stroke, but it serves to use the closing energy to bounce the hammer assembly 3 back more quickly by forcibly breaking open the magnetic circuit and creating a high reluctance air gap immediately so that the magnetic retentivity does not delay the return stroke by the sticking action otherwise prevalent. This significantly increases the speed of operation of the solenoid so that an electromagnetic tape advancing solenoid becomes practical at reading speeds of up to at least fifty steps per second. Thus, the simplified tape reader is useful in many sorts of data processing systems.

Figure 4:
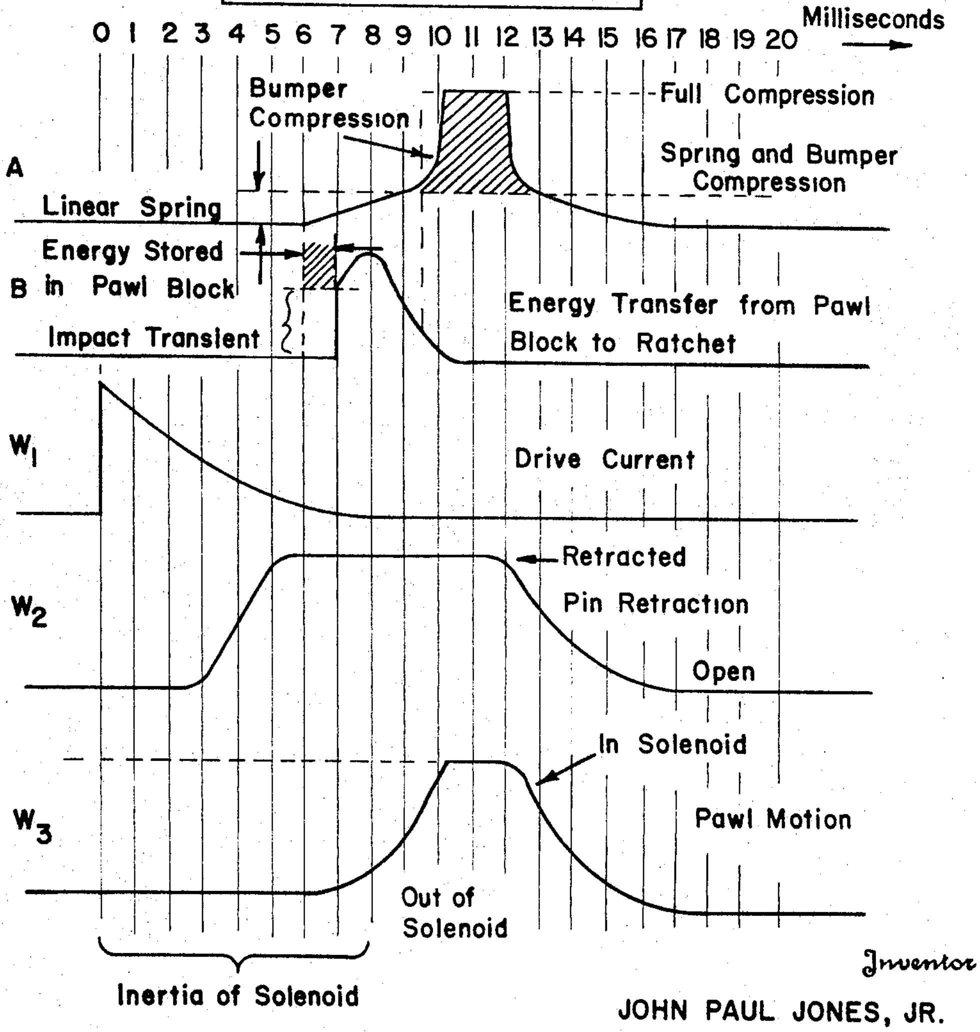
FIGURE 4 is a sketch of timing waveforms illustrating operation of the reader in accordance with the principles of the invention.

In reading the tape a two-step action occurs from a single asynchronous input driving pulse $W_1$ which may be seen from FIGURE 4. This waveform can be derived from the discharge of a capacitor upon closure of a switch or the operation of a transistor. Because of the large inertia of the core 4 and hammer block 3 and the amount of motion required before the tape is moved, a delay of six or seven milliseconds may occur after the impulse waveform $W_1$ is initiated before the pawl begins to move, as shown in waveform $W_3$. Thus, the pin retracting solenoid 15 is chosen to be smaller and lighter with a smaller magnetic air gap so that it may move very quickly to retract the plurality of associated armatures 7 and corresponding punch sensing pins 6 fully in five milliseconds or less as shown by waveform $W_2$. Both coils are thus energized simultaneously with the input pulse and the basic timing sequence is carried out by design and inertia of the parts of the exclusion of any elaborate mechanical linkages or changeable values.

As may be seen from comparison of the waveforms $W_2$ and $W_3$, the pins are fully retracted as the tape is advanced and the pin solenoid 15 is opened at about the same time the pawl solenoid 5 completes its action in something less than twenty milliseconds. The timing sequence overlaps will remain with safe tolerances without drift or adjustment in this operation.

The graphical representation A illustrates the operation of the bumper impact block 22 and the spring 19 on the return of the pawl hammer 3. Thus, bumper 22 becomes fully compressed at about ten milliseconds, which occurs after the spring reaction has started in the initial movement of the armature core 4 and just after the time the tape is fully advanced and cylinder 1 is ratcheted to its stop position as shown in graphical representation B. This causes the sticking or hysteresis action of the solenoid to be fully broken by the energy stored in bumper 22 in about two milliseconds after which the hammer returns very quickly.

Also the impact transient storage action and reaction during the start of the energy transfer from the already moving pawl hammer block when it strikes the ratchet is shown in graph B. In this manner, the tape step action is accelerated and the next operation cycle may begin as soon as the pawl block assembly energy is dissipated. It is evident therefore, that very simple programming with a single drive pulse is accomplished by the two-step solenoid action of coils 5 and 15. The pins 6 then hold the information stored in the punched tape from the pin relay open position near 15 milliseconds until the information is destroyed at the next retraction about three milliseconds after the start of the drive current pulse $W_2$.

It is also significant that no standby power is required and no heating occurs or wear to the reader unless it is actually used in a reading operation. This significantly decreases maintenance requirements. In use only the ratchet and pawl assemblies are precision made parts so that the reader is simple to construct and is inexpensive. Yet all the required reading features are contained therein that are distributed in a plurality of different reader concepts of the prior art, each more complex overall than the present structure.

Figure 3:
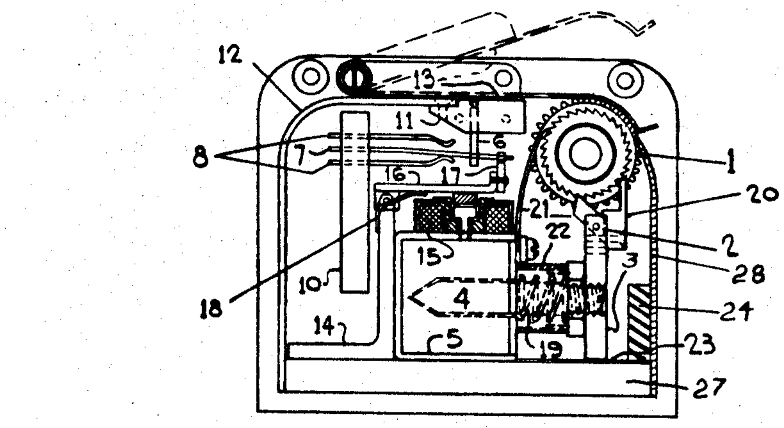
FIGURE 3 is a side view of the tape reader of FIGURE 1.

The size of the unit, which is enclosed as shown in FIGURE 2 by the front and back closure plates 25 and 26, is tiny as visualized by the one inch wide tape capacity of the unit. Mounting block 27 holds the one inch plus wide rear platen 12 and pin block 11 in place for the tape to pass over in the rear, and the face plate 28 is mounted in the front. The tape is held against the pins 6 and sprocket cylinder 1 by the retainer clip 13 shown in FIGURE 3. Thus, short tape loops may be passed around the unit or tape may be pulled from a feed reel without any external drive means, the reader being completely self-contained.

The mounting block 27 and side walls 25, 26 of the case enclose the reader and have plastic sheets 23 held on their walls to provide a bearing surface for movement of the pawl hammer assembly 3, thereby comprising an extremely simple, long life mounting structure not requiring conventional bearings and guide means.

Having therefore provided an improved tape reader as herein taught, the features of novelty are defined with particularity in the claims which follow.

I claim:

1. A punched tape reader comprising in combination, an electromagnetic solenoid having a core reciprocally movable therein to a closed low reluctance magnetic circuit therein, a cylinder sprocket for engaging and moving punched tape along a predetermined path, a ratchet coupled for rotating said sprocket, a pawl assembly for engaging the ratchet to advance the sprocket step by step, means mounting the pawl in one position out of contact with the ratchet, means coupling the pawl to said solenoid core for reciprocal movement therewith, and an energy storing bumper block for encountering the pawl assembly near the end of the reciprocal stroke after the sprocket is ratcheted thereby quickly forcing the pawl assembly and coupled core to leave the influence of the solenoid and return to said out of contact position.

2. A tape reader as defined in claim 1, wherein a second solenoid is provided which operates more quickly than the first mentioned solenoid, means is provided for energizing both solenoids simultaneously, and structure operated by said second solenoid comprising electrical contact structure movable to a retracted position when the second solenoid is energized and punch sensing pins coupled to the contact structure to permit movement to a second position when a punched hole is encountered.

3. A tape reader as defined in claim 1, wherein the pawl assembly is essentially a movable hammer block having three straight portions, a case having walls which enclose the three straight portions encloses the reader, and plastic sheets are held on the case walls to provide a bearing surface for movement of the hammer.

4. A tape processor for advancing punched tape step by step comprising a cylinder tape advance sprocket, a ratchet and pawl assembly for rotating said sprocket, a solenoid coupled to reciprocate the pawl, and an energy storing bumper assembly engaging the pawl at the end of the solenoid stroke to thereby bounce the pawl back and break the solenoid hysteresis action.

5. A tape processor as defined in claim 4, wherein the pawl is mounted when the solenoid is not energized in a position out of contact with the ratchet to thereby permit the solenoid movement of the pawl to begin before the tape advancing load is encountered.

6. A tape processor as defined in claim 4 including an electromagnetically operated punched tape sensor, and means to energize the solenoid and sensor simultaneously.

7. In a tape processor the combination of a sensing relay having a plurality of parallel mounted contact springs, an insulated caging block loosely confining the contact springs in individual slots, a solenoid with an armature coupled to move the caging block when the solenoid is energized to thereby place the contact springs in a first position removed from the position in the de-energized condition of the solenoid, sensing pins coupled to each contact spring for movement therewith to two positions corresponding to the caging block location, electrical contacts mating with the contact springs to provide output signals indicating the pin position, and means for passing a punched tape with apertures in registration with one sensing pin position, whereby the sensing pins may move the contact springs within the caging block slots dependent upon the absence of an aperture in the tape at the respective pin location to thereby provide a code signal at the electrical contacts corresponding to the punched tape code displayed at the pin location.

References Cited

UNITED STATES PATENTS

| | | | |
|---|---|---|---|
| 3,201,571 | 8/1965 | Gryk | 235—61.11 |
| 3,051,381 | 8/1962 | Drillick | 235—61.11 |

DARYL W. COOK, *Primary Examiner.*